March 5, 1940.　　　S. G. GREEN　　　2,192,188
GEARING
Filed March 13, 1936　　　2 Sheets-Sheet 1
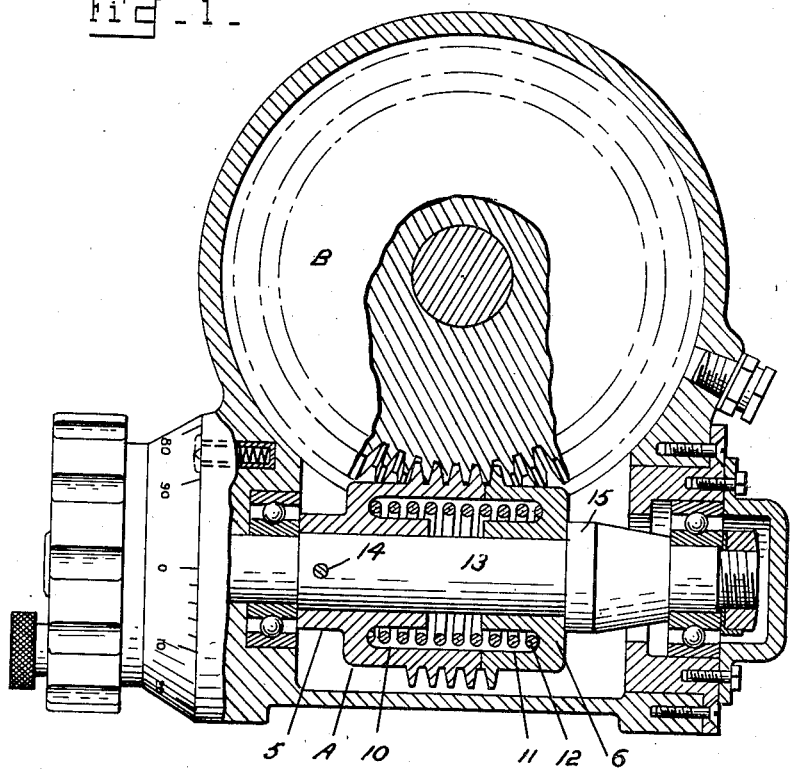
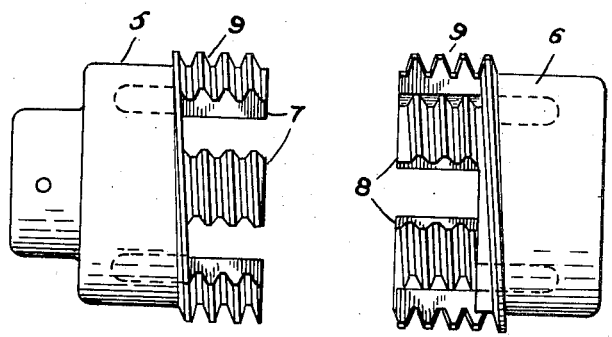
Inventor
Samuel G. Green
By W. N. Roach
Attorney March 5, 1940.    S. G. GREEN    2,192,188
GEARING
Filed March 13, 1936    2 Sheets-Sheet 2
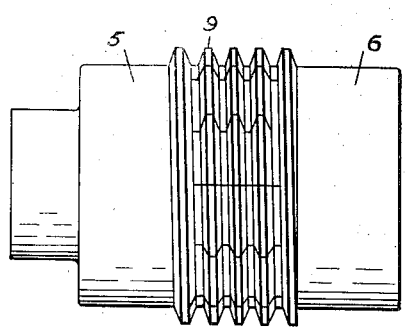
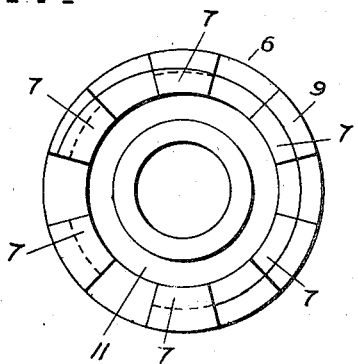
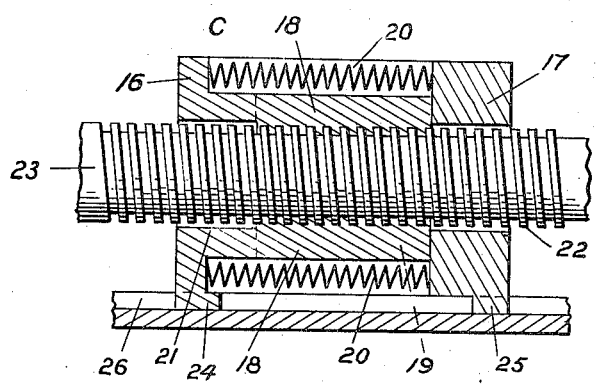
Inventor
Samuel G. Green
By W. N. Roach
Attorney Patented Mar. 5, 1940

2,192,188

UNITED STATES PATENT OFFICE 2,192,188

GEARING

Samuel G. Green, Gray, Ga.

Application March 13, 1936, Serial No. 68,690

7 Claims. (Cl. 74—440)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to gearing.

The purpose of this invention is to provide an arrangement of reversible gearing for taking up clearance wherein a constant driving ratio is maintained without changing the pitch line or distance between the centers of the gears.

This is accomplished by dividing a pinion into two parts with overlapping and interengaging clutch fingers on which a continuous thread is cut.

To these and other ends, the invention consists in the construction, arrangement and combination of elements described herein after and pointed out in the claims forming a part of this specification.

A practical embodiment of the invention is illustrated in the accompanying drawings, wherein:

Fig. 1 is a longitudinal sectional view, with parts in elevation, of the improved gearing.

Fig. 2 is a view in side elevation of the pinion with the parts separated.

Fig. 3 is a view in side elevation with the parts assembled.

Fig. 4 is an end view of one of the parts.

Fig. 5 is a longitudinal sectional view showing the application of the invention to gearing in the form of a nut.

In the preferred embodiment of the invention shown in Figs. 1-4, there is shown helical gearing comprising a pinion or screw A and an intermeshing element or gear wheel B. The screw A is formed of two parts 5 and 6 each having a plurality of spaced fingers or clutch members respectively designated 7 and 8, and adapted to overlap and interengage when the parts are brought together.

A thread 9 is cut in the screw with the parts in assembled relation and closely adjoining so that the working thread portions on the interengaged fingers, in the normal position of the latter, form a continuous thread of substantially uniform cross section. The threads are preferably coextensive with the fingers although they may extend beyond the bases of the fingers.

Some form of pressure means, of hydraulic, pneumatic or spring, type, or a combination of these elements is employed to act on the parts 5 and 6 and normally tend to move them with relation to each other. As an example, in Fig. 1, the meeting faces of the parts 5 and 6 are respectively provided with aligned annular recesses 10 and 11 for receiving a spring 12.

The screw is mounted on a driving shaft 13, the part 5 being fixed thereto by a pin 14 and the part 6 being slidable thereon so that it is free to move axially relative to the fixed part. A collar 15 on the shaft limits the movement of the part 6 to a very small amount.

In Fig. 5 the invention is shown as applied to gearing in the form of a nut or internal screw C having two parts 16 and 17, respectively provided with interengaging clutch fingers 18 and 19. Springs 20—20 confined between the parts, act to normally tend to separate the parts. A continuous thread 21 cut on the internal wall of the nut engages the thread 22 of a screw shaft or intermeshing element 23. Ribs 24 and 25 respectively on the parts 16 and 17 are engaged in the groove 26 of a supporting member to hold the nut against rotation.

It will be noted that the fingers or clutch members 7 and 8 preferably have a length to accommodate three threads and constitute the major threaded portion and also that their width is so related to the gear wheel B that the threads of at least two adjacent clutch members of each part 5 or 6 will be capable of simultaneously meshing with the gear wheel.

I claim:

1. In an assembly of a reversible screw and intermeshing element in combination, a screw member comprising a pair of relative axially movable parts including complemental interengaging clutch members mutually overlapping sufficiently to bear one or more pitches of thread portions formed thereon, said clutch members having thread portions formed thereon to provide in their normal positions a continuous thread of substantially uniform cross-section traversing said members one or more revolutions, means interposed between said parts operable to effect relative axial movement thereof, an element disposed in meshing relation with the screw thread and meshing with one or more pitches thereof, and said meshing element and clutch members being so related that the meshing element will always mesh with the thread portions of at least two opposed clutch members; whereby clearance between the thread and meshing member may be reduced in the driving direction without throwing the working thrust therebetween on a thread portion of reduced cross-section or changing the driving ratio.

2. In a reversible screw and gear assembly in combination, a screw member comprising a pair of relative axially movable parts including complemental interengaging clutch members mutually overlapping sufficiently to bear a plurality of pitches of thread portions formed thereon, said clutch members having thread portions formed thereon to provide in their normal positions a continuous thread of substantially uniform cross-section traversing said members a plurality of revolutions, means interposed between said parts operable to effect relative axial movement thereof, a gear disposed in meshing relation with the screw thread and having a circular pitch adapting its teeth to be drivingly engaged by said thread through at least three pitches, and said gear and clutch members being so related in width that the gear teeth will always engage the thread portions of at least two opposed clutch members; whereby clearance between the thread and gear teeth may be reduced in the driving direction without throwing the working thrust therebetween on a thread portion of reduced cross-section or changing the driving ratio.

3. In a screw and gear assembly in combination, a screw member comprising a pair of relative axially movable parts including complemental interengaging clutch members having formed thereon thread portions which in the normal position of said clutch members constitute a continuous thread of substantially uniform cross-section traversing the members at least one revolution, means interposed between said parts operable to effect relative axial movement thereof, and a gear having teeth engaging said thread, whereby driving contact between said screw and gear may be maintained in the driving direction without throwing the working thrust between said thread and gear teeth on a thread portion of reduced cross-section.

4. In an assembly of the class described in combination, a shaft journaled for rotation, a screw member comprising a pair of generally cylindrical relative axially movable parts including complemental interengaging clutch members mutually overlapping sufficiently to bear at least one revolution of a thread formed thereon mounted on said shaft with one part fixed thereto and the other part slidable thereon, said clutch members in their normal positions having thread portions formed thereon to provide a continuous thread of substantially uniform cross-section through at least one revolution, means interposed between said parts operable to effect relative axial movement thereof, a gear disposed in meshing relation with said screw thread and being so related in size with respect thereto as to always intermesh with the thread portions on at least two opposed clutch members; whereby clearance between the thread and intermeshing gear may be reduced in the driving direction without throwing the working thrust therebetween on a thread portion of reduced cross-section or changing the driving ratio, and means for rotating said shaft.

5. In a screw and nut assembly in combination, a nut member comprising a pair of relative axially movable parts including complemental interengaging clutch members mutually overlapping sufficiently to bear a plurality of revolutions of a continuous thread, said clutch members in their normal positions being formed with internal thread portions arranged to provide a continuous internal thread of substantially uniform cross-section extending through a plurality of revolutions, means interposed between said parts operable to effect relative axial movement thereof, and a reversible screw disposed in meshing relation with said internal screw whereby clearance between the intermeshing thread portions may be reduced in the driving direction without throwing the working thrust therebetween on a thread portion of reduced cross-section or changing the driving ratio.

6. In a compensating screw in combination, a screw member comprising a pair of relative axially movable parts including a plurality of relative narrow complemental interengaging clutch members mutually overlapping a plurality of pitches of a thread formed thereon, said clutch members in their normal positions being formed to provide a continuous thread of substantially uniform cross-section extending through said plurality of pitches, and means interposed between said parts normally tending to effect axial separation thereof.

7. In a compensating screw in combination, a screw member comprising a pair of opposed generally cylindrical relative axially movable parts having on their confronting portions a plurality of complemental interengaging clutch members mutually overlapping a plurality of pitches of a thread formed thereon, said parts being formed interiorly to provide opposed aligned recesses, said clutch members being formed to provide in their normal positions a continuous thread of substantially uniform cross-section extending through said plurality of pitches, and spring means disposed in said opposed aligned recesses biased to normally effect axial separation of the said parts.

SAMUEL G. GREEN.